United States Patent
Li et al.

(10) Patent No.: US 11,237,679 B2
(45) Date of Patent: Feb. 1, 2022

(54) TOUCH PANEL, TOUCH SUBSTRATE, AND TOUCH CONTROL DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Jun Li, Beijing (CN); Tsungchieh Kuo, Beijing (CN); Qicheng Chen, Beijing (CN); Jiawei Xu, Beijing (CN); Lei Zhang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 484 days.

(21) Appl. No.: 16/330,733

(22) PCT Filed: Dec. 15, 2017

(86) PCT No.: PCT/CN2017/116536
§ 371 (c)(1),
(2) Date: Mar. 5, 2019

(87) PCT Pub. No.: WO2019/113956
PCT Pub. Date: Jun. 20, 2019

(65) Prior Publication Data
US 2021/0333935 A1   Oct. 28, 2021

(51) Int. Cl.
*B05D 5/12* (2006.01)
*G06F 3/044* (2006.01)
(Continued)

(52) U.S. Cl.
CPC .......... *G06F 3/0445* (2019.05); *G06F 3/0412* (2013.01); *G06F 3/0448* (2019.05); *G02F 1/13338* (2013.01); *G06F 2203/04112* (2013.01)

(58) Field of Classification Search
CPC .... G06F 3/0445; G06F 3/0448; G06F 3/0412; G06F 2203/04112; G02F 1/13338
See application file for complete search history.

(56) References Cited

U.S. PATENT DOCUMENTS

| | | | |
|---|---|---|---|
| 2011/0256307 A1* | 10/2011 | Kim | G06F 3/0445 427/79 |
| 2015/0268762 A1 | 9/2015 | Wang et al. | |

(Continued)

FOREIGN PATENT DOCUMENTS

| | | |
|---|---|---|
| CN | 103279217 A | 9/2013 |
| CN | 106201145 A | 12/2016 |
| CN | 106249979 A | 12/2016 |

OTHER PUBLICATIONS

International Search Report & Written Opinion dated Sep. 19, 2018, regarding PCT/CN2017/116536.

*Primary Examiner* — Deeprose Subedi
(74) *Attorney, Agent, or Firm* — Intellectual Valley Law, P.C.

(57) ABSTRACT

The present application discloses a touch panel including a base substrate, a first touch electrode layer on the base substrate, and a second touch electrode layer. The first touch electrode layer includes a plurality of first touch electrodes. Each of the plurality of first touch electrodes includes a plurality of first touch electrode patterns along a second direction, each of which extending substantially along a first direction. The second touch electrode layer includes a plurality of second touch electrodes along the second direction. Each of the plurality of second touch electrodes extends (Continued)

substantially along the first direction. The first touch electrode layer and the second touch electrode layer are insulated from each other.

16 Claims, 9 Drawing Sheets

(51) Int. Cl.
*G06F 3/041* (2006.01)
*G02F 1/1333* (2006.01)

(56) References Cited

U.S. PATENT DOCUMENTS

| | | | |
|---|---|---|---|
| 2016/0048248 A1* | 2/2016 | Na | G06F 3/047 |
| | | | 345/174 |
| 2016/0048348 A1* | 2/2016 | Bushman | G06F 3/0665 |
| | | | 711/114 |

* cited by examiner

US 11,237,679 B2

TOUCH PANEL, TOUCH SUBSTRATE, AND TOUCH CONTROL DISPLAY APPARATUS

CROSS-REFERENCE TO RELATED APPLICATION

This application is a national stage application under 35 U.S.C. § 371 of International Application No. PCT/CN2017/116536, filed Dec. 15, 2017, the contents of which are incorporated by reference in the entirety.

TECHNICAL FIELD

The present invention relates to display technology, more particularly, to a touch panel, a touch substrate, and a touch control display apparatus.

BACKGROUND

Touch control display panels have found a wide range of applications in the display field such as mobile phones, computer display panels, touch screens, satellite navigation devices, and digital cameras. Touch control display panels can be categorized into three classes: add-on type touch panels, on-cell type touch panels, and in-cell touch type panels. Touch display panels may be a self-capacitive type or a mutual capacitive type touch display panel. Touch control display panels may use mesh electrodes as the touch electrodes or use metal oxide materials (e.g., indium tin oxide) as the touch electrode material.

SUMMARY

In one aspect, the present invention provides a touch panel comprising a base substrate; a first touch electrode layer on the base substrate and comprising a plurality of first touch electrodes, each of the plurality of first touch electrodes comprises a plurality of first touch electrode patterns along a second direction, each of which extending substantially along a first direction; and a second touch electrode layer comprising a plurality of second touch electrodes along the second direction, each of the plurality of second touch electrodes extending substantially along the first direction; wherein the first touch electrode layer and the second touch electrode layer are insulated from each other.

Optionally, the touch panel further comprises a plurality of first touch signal lines, each of which extending substantially along the second direction in parallel; wherein each of the plurality of first touch electrodes electrically connect with one or more of the plurality of first touch signal lines; and the plurality of first touch electrode patterns in each of the plurality of first touch electrodes are electrically connected by the one or more of the plurality of first touch signal lines.

Optionally, each of the plurality of first touch electrodes is electrically connected with multiple ones of the plurality of first touch signal lines electrically connected in parallel.

Optionally, the plurality of first touch electrode patterns from the plurality of first touch electrodes constitute a plurality of rows of first touch electrode patterns; the plurality of second touch electrodes constitute a plurality of rows of second touch electrodes; two adjacent rows of the plurality of rows of second touch electrodes sandwich one or more rows of the plurality of rows of first touch electrode patterns; and two adjacent rows of the plurality of rows of first touch electrode patterns sandwich one or more rows of the plurality of rows of second touch electrodes.

Optionally, the plurality of rows of second touch electrodes and the plurality of rows of first touch electrode patterns are alternately disposed along the second direction.

Optionally, each of the plurality of first touch electrode patterns is a mesh electrode.

Optionally, the mesh electrode of each of the plurality of first touch electrode patterns has a repeating geometric shape.

Optionally, each of the plurality of second touch electrodes is a mesh electrode.

Optionally, the mesh electrode of each of the plurality of second touch electrodes has a repeating geometric shape.

In another aspect, the present invention provides a touch control display apparatus having an array of a plurality of subpixels along the first direction and the second direction, comprising a touch panel described herein or fabricated by a method described herein.

Optionally, each of the plurality of first touch electrode patterns is in an inter-subpixel region between two adjacent rows of subpixels; each of the plurality of second touch electrodes is in an inter-subpixel region between two adjacent rows of subpixels; and each of the two adjacent rows of subpixels extending substantially along the first direction.

Optionally, the plurality of first touch electrode patterns from the plurality of first touch electrode constitute a plurality of rows of first touch electrode patterns; the plurality of second touch electrodes constitute a plurality of rows of second touch electrodes; two or more adjacent rows of subpixels are sandwiched between two adjacent rows of the plurality of rows of second touch electrodes; two or more adjacent rows of subpixels are sandwiched between two adjacent rows of the plurality of rows of first touch electrode patterns; and each of the two adjacent rows of subpixel areas extending substantially along the first direction.

Optionally, the touch control display apparatus further comprises a black matrix layer; wherein an orthographic projection of the black matrix layer on the base substrate substantially covers orthographic projections of the plurality of first touch electrode patterns and the plurality of second touch electrodes.

Optionally, the touch panel further comprises a plurality of first touch signal lines, each of which extending substantially along the second direction in parallel; each of the plurality of first touch electrodes is electrically connected with one or more of the plurality of first touch signal lines; the plurality of first touch electrode patterns in each of the plurality of first touch electrodes are electrically connected by the one or more of the plurality of first touch signal lines; and each of the one or more of the plurality of first touch signal lines electrically connected in parallel is in an inter-subpixel region between two adjacent columns of subpixels, each of the two adjacent columns of subpixels extending substantially along the second direction.

Optionally, each of the plurality of first touch electrodes is electrically connected with multiple ones of the plurality of first touch signal lines electrically connected in parallel; and the multiple ones of the plurality of first touch signal lines electrically connected in parallel are spaced apart from each other by one or more columns of subpixels.

Optionally, the touch control display apparatus further comprises a black matrix layer; wherein an orthographic projection of the black matrix layer on the base substrate substantially covers orthographic projections of the plurality of first touch signal lines.

In another aspect, the present invention provides a touch substrate having an array of a plurality of subpixel areas along a first direction and a second direction, comprising a base substrate; a first touch electrode layer on the base substrate and comprising a plurality of first touch electrodes, each of the plurality of first touch electrodes comprises a plurality of first touch electrode patterns along the second direction, each of which extending substantially along a first direction; and a second touch electrode layer comprising a plurality of second touch electrodes along the second direction, each of the plurality of second touch electrodes extending substantially along the first direction; wherein the first touch electrode layer and the second touch electrode layer are insulated from each other.

Optionally, each of the plurality of first touch electrode patterns is in an inter-subpixel region between two adjacent rows of subpixel areas; each of the plurality of second touch electrodes is in an inter-subpixel region between two adjacent rows of subpixel areas; and each of the two adjacent rows of subpixels extends substantially along the first direction.

Optionally, the touch substrate further comprises a plurality of first touch signal lines, each of which extending substantially along the second direction in parallel; each of the plurality of first touch electrodes is electrically connected with one or more of the plurality of first touch signal lines; the plurality of first touch electrode patterns in each of the plurality of first touch electrodes are electrically connected by the one or more of the plurality of first touch signal lines; and each of the one or more of the plurality of first touch signal lines electrically connected in parallel is in an inter-subpixel region between two adjacent columns of subpixel areas; and each of the two adjacent columns of subpixel areas extending substantially along the second direction.

In another aspect, the present invention provides a touch control display apparatus comprising the touch substrate described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional mesh electrode touch control display panel, a plurality of mesh electrodes are formed as conductive channels for transmitting touch signals, e.g., touch scanning signals and touch sensing signals. In the conventional mesh electrode touch control display panel, linear stretches of horizontal or vertical mesh electrodes may have interference with the display module, resulting in Moiré patterns. Attempts to reduce Moiré patterns have been made by reducing the line width of the mesh electrodes and forming mesh electrodes in directions not parallel to the rows of subpixels in the display module. These measures achieve only limited improvements on the Moiré pattern issue, and create additional issues such as line open and electrostatic discharge.

Accordingly, the present disclosure provides, inter alia, a touch panel, a touch substrate, and a touch control display apparatus that substantially obviate one or more of the problems due to limitations and disadvantages of the related art. In one aspect, the present disclosure provides a touch panel. In some embodiments, the touch panel includes a base substrate; a first touch electrode layer and a second touch electrode layer on the base substrate and insulated from each other. Optionally, the first touch electrode layer includes a plurality of first touch electrodes, each of the plurality of first touch electrodes includes a plurality of first touch electrode patterns along the second direction, each of which extending substantially along a first direction. Optionally, the second touch electrode layer includes a plurality of second touch electrodes along the second direction, each of the plurality of second touch electrodes extending substantially along the first direction.

Figure 1:
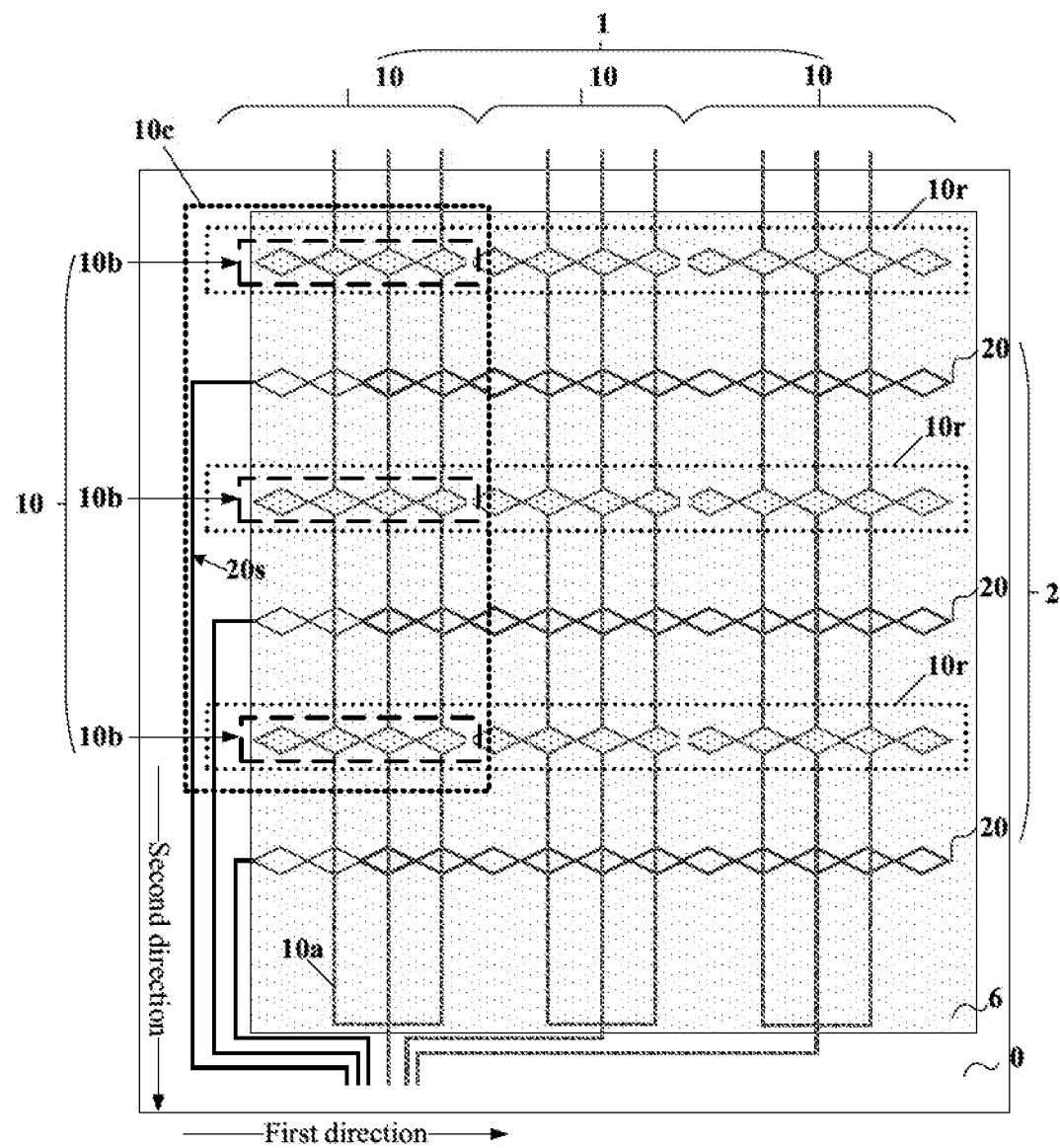
FIG. 1 is a schematic diagram illustrating the structure of a touch panel in some embodiments according to the present disclosure.

FIG. 1 is a schematic diagram illustrating the structure of a touch panel in some embodiments according to the present disclosure. Referring to FIG. 1, the touch panel in some embodiments includes a base substrate 0, a first touch electrode layer 1 and a second touch electrode layer 2 on the base substrate 0 and are insulated from each other.

The first touch electrode layer 1 includes a plurality of first touch electrodes 10. Each of the plurality of first touch electrodes 10 includes a plurality of first touch electrode patterns 10b. The plurality of first touch electrode patterns 10b are arranged along a second direction. Each of the plurality of first touch electrode patterns 10b extends substantially along a first direction. The second touch electrode layer 2 includes a plurality of second touch electrodes 20. The plurality of second touch electrodes 20 are arranged along the second direction. Each of the plurality of second touch electrodes 20 extends substantially along the first direction. The first touch electrode layer 1 and the second touch electrode layer 2 are insulated from each other. For example, the first touch electrode layer 1 and the second touch electrode layer 2 may be insulated from each other by an insulating layer 6.

Referring to FIG. 1, the touch panel in some embodiments further includes a plurality of first touch signal lines 10a.

Each of the plurality of first touch signal lines 10a extends substantially along the second direction. Each of the plurality of first touch electrodes 10 is electrically connected with one or more of the plurality of first touch signal lines 10a electrically connected in parallel. In each of the plurality of first touch electrodes 10, the plurality of first touch electrode patterns 10b are electrically connected by the one or more of the plurality of first touch signal lines 10a.

As shown in FIG. 1, the plurality of first touch electrode patterns 10b in one of the plurality of first touch electrodes 10 are electrically insulated from the plurality of first touch electrode patterns 10b in adjacent ones of the plurality of first touch electrodes 10.

Figure 2:
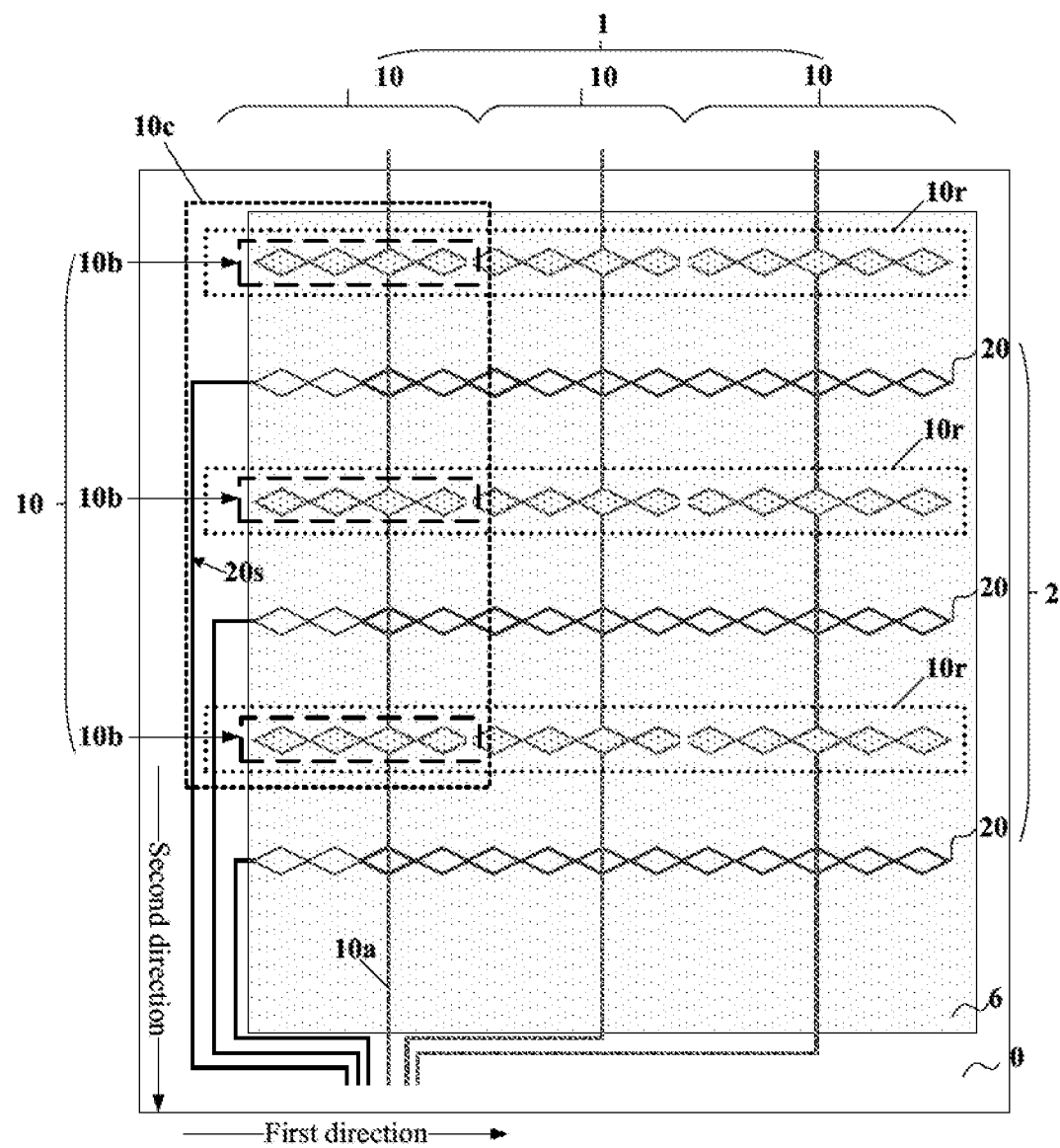
FIG. 2 is a schematic diagram illustrating the structure of a touch panel in some embodiments according to the present disclosure.

FIG. 2 is a schematic diagram illustrating the structure of a touch panel in some embodiments according to the present disclosure. Referring to FIG. 2, each of the plurality of first touch electrodes includes a single one of the plurality of first touch signal lines.

Referring to FIG. 1, in some embodiments, each of the plurality of first touch electrodes 10 is electrically connected with multiple ones of the plurality of first touch signal lines 10a electrically connected in parallel. FIG. 1 depicts an embodiment in which each of the plurality of first touch electrodes 10 is electrically connected with three of the plurality of first touch signal lines 10a electrically connected in parallel. By having multiple ones of the plurality of first touch signal lines 10a electrically connected in parallel, the resistance of the first touch electrode 10 can be effectively reduced, enhancing touch signal transmission.

In FIG. 1 and FIG. 2, the plurality of first touch electrode patterns 10b from the plurality of first touch electrode 10 form a plurality of rows 10r of first touch electrode patterns, and the plurality of second touch electrodes 20 are a plurality of rows of second touch electrodes. Each of the plurality of rows 10r of first touch electrode patterns includes a plurality of first touch electrode patterns 10b respectively from the plurality of first touch electrode 10. As shown in FIG. 1 and FIG. 2, each of the plurality of rows 10r of first touch electrode patterns includes three of the plurality of first touch electrode patterns 10b respectively from three of the plurality of first touch electrode 10. Optionally, two adjacent rows of the plurality of rows of second touch electrodes sandwich one or more rows of the plurality of rows 10r of first touch electrode patterns 10b. Optionally, two adjacent rows of the plurality of rows 10r of first touch electrode patterns 10b sandwich one or more rows of the plurality of rows of second touch electrodes. In FIG. 1 and FIG. 2, two adjacent rows of the plurality of rows of second touch electrodes sandwich a single row of the plurality of rows 10r of first touch electrode patterns 10b, and two adjacent rows of the plurality of rows 10r of first touch electrode patterns 10b sandwich a single row of the plurality of rows of second touch electrodes. Optionally, two adjacent rows of the plurality of rows of second touch electrodes sandwich two rows of the plurality of rows 10r of first touch electrode patterns 10b. Optionally, two adjacent rows of the plurality of rows of first touch electrode patterns 10b sandwich two rows of the plurality of rows of second touch electrodes.

As shown in FIG. 1 and FIG. 2, in some embodiments, the plurality of second touch electrodes 20 and the plurality of first touch electrode patterns 10 are alternately disposed along the second direction.

In some embodiments, the plurality of first touch electrode patterns 10b from the plurality of first touch electrode 10 form a plurality of columns 10c of first touch electrode patterns. Optionally, the plurality of first touch electrode patterns 10 in a single column of the plurality of columns 10c of first touch electrode patterns are all from a single one of the plurality of first touch electrodes 10, as shown in FIG. 1 and FIG. 2. Optionally, the plurality of first touch electrode patterns 10b in a single row of the plurality of rows 10r of first touch electrode patterns are from different ones of the plurality of first touch electrodes 10; and the plurality of first touch electrode patterns 10b in a single column of the plurality of columns 10c of first touch electrode patterns are all from a single one of the plurality of first touch electrodes 10.

In some embodiments, the touch panel further includes a plurality of second touch signal lines 20s. Optionally, each of the plurality of second touch signal lines 20s is electrically connected to at least one of the plurality of second touch electrodes 20 to transmit touch signals to or from the at least one of the plurality of second touch electrodes 20. Optionally, the plurality of second touch signal lines 20s are in a peripheral area of the touch panel. Optionally, the plurality of first touch signal lines 10a are at least partially in a display area of the touch panel.

Optionally, each of the plurality of first touch electrode patterns 10b is a mesh electrode, e.g., a metal mesh electrode. Optionally, each of the plurality of second touch electrodes 20 is a mesh electrode, e.g., a metal mesh electrode. Optionally, the mesh electrode of each of the plurality of first touch electrode patterns 10b has a repeating geometric shape. Optionally, the mesh electrode of each of the plurality of second touch electrodes 20 has a repeating geometric shape. Examples of appropriate repeating geometric shape include, but are not limited to, a diamond shape, a tetragonal shape, a triangular shape, a polygonal shape, a square shape, a circular shape, and an elliptical shape. Other geometric shapes or irregular shapes may also be used together to form the plurality of first touch electrode patterns 10b or the plurality of second touch electrodes 20.

Various appropriate conductive materials may be used for making the first electrode layer 1 and the second electrode layer 2. Examples of transparent conductive materials suitable for making the first electrode layer 1 and the second electrode layer 2 include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the electrode layer is made of a metal mesh such as a nano-silver mesh. Various appropriate mesh patterns may be used for making the first electrode layer 1 and the second electrode layer 2. The first electrode layer 1 may have one or more first mesh pattern and the second electrode layer 2 may have one or more second mesh pattern. Optionally, the first mesh pattern is the same as the second mesh pattern. Various appropriate mesh aperture ratios, mesh line widths, mesh line thicknesses, and opening widths may be used for making the first mesh electrode layer and the second mesh electrode layer. The mesh aperture ratios, mesh line widths, mesh line thicknesses, and opening widths may be selected to achieve optimal electrical conductivity and low resistance.

Figure 3:
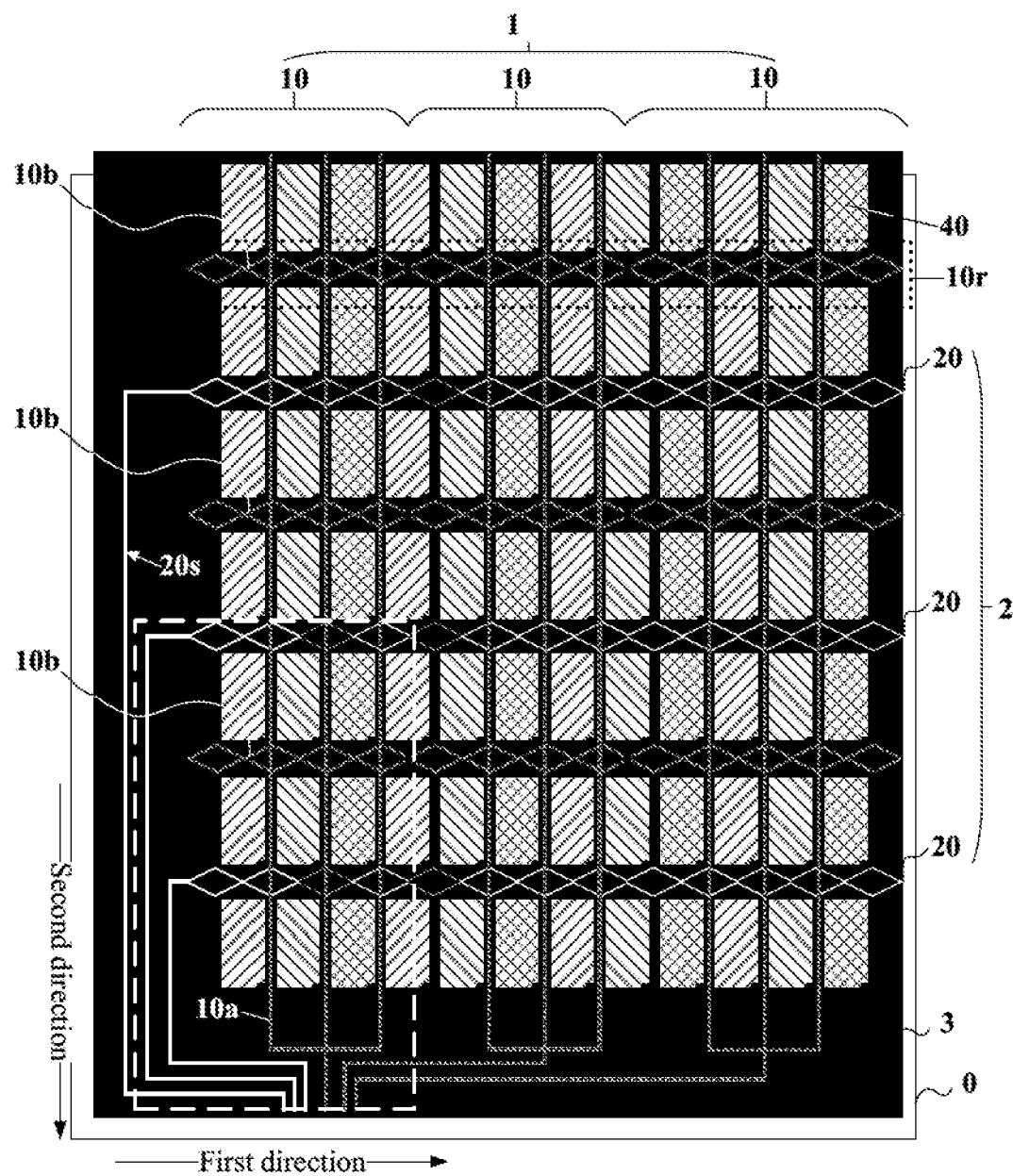
FIG. 3 is a schematic diagram illustrating the structure of a touch control display apparatus having a touch panel in some embodiments according to the present disclosure.
Figure 4:
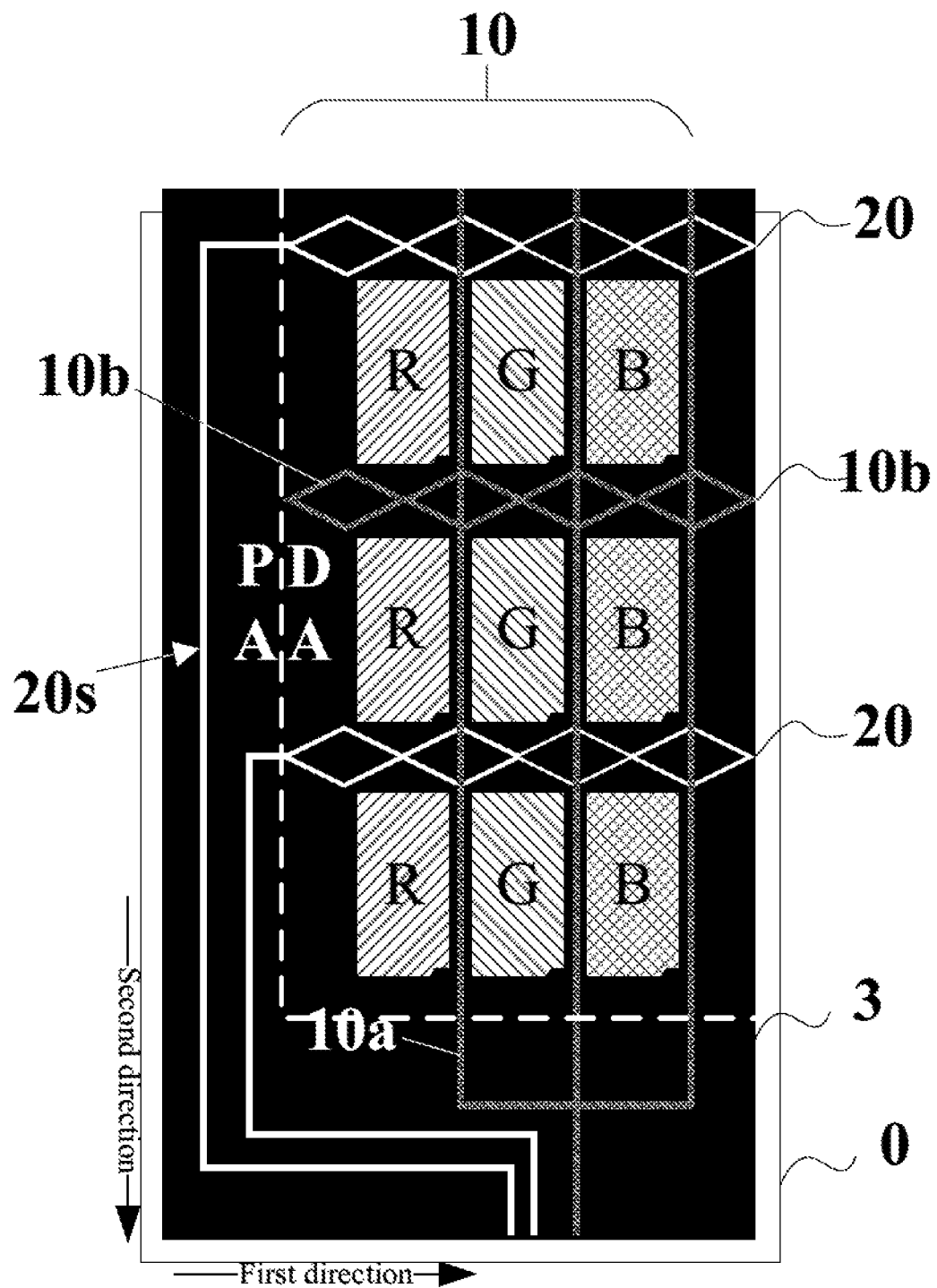
FIG. 4 is a zoom-in view of an area encircled by dotted lines in the touch control display apparatus of FIG. 3.

In another aspect, the present disclosure provides a touch control display apparatus. FIG. 3 is a schematic diagram illustrating the structure of a touch control display apparatus having a touch panel in some embodiments according to the present disclosure. FIG. 4 is a zoom-in view of an area encircled by dotted lines in the touch control display apparatus of FIG. 3. Referring to FIG. 3 and FIG. 4, the touch control display apparatus in some embodiments includes a base substrate 0, a black matrix layer 3 on the base substrate 0, and a first touch electrode layer 1 on a side of the black matrix layer 3 distal to the base substrate 0. Optionally, the touch control display apparatus includes an array of a plurality of subpixels 40 along the first direction and the second direction. In some embodiments, the first electrode layer 1 is substantially disposed in an inter-subpixel region of the touch control display apparatus.

As used herein, an inter-subpixel region refers to a region between adjacent subpixel regions, such as a region corresponding to a black matrix in a liquid crystal display, or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel. As used herein, a subpixel region refers to a light emission region of a subpixel, such as a region corresponding to a pixel electrode in a liquid crystal display, or a region corresponding to a light emissive layer in an organic light emitting diode display panel. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

Optionally, the first electrode layer 1 is substantially in a region corresponding to the black matrix layer 3, e.g., an orthographic projection of the black matrix layer 3 on the base substrate 0 substantially covers that of the first touch electrode layer 1. As shown in FIG. 3 and FIG. 4, the first touch electrode layer 1 includes a plurality of first touch electrodes 10. Each of the plurality of first touch electrodes 10 includes a plurality of first touch electrode patterns 10b. The plurality of first touch electrode patterns 10b are arranged along a second direction. Each of the plurality of first touch electrode patterns 10b extends substantially along a first direction. Optionally, each of the plurality of first touch electrode patterns 10b is in an inter-subpixel region between two adjacent rows of subpixels. Each of the two adjacent rows of subpixels extends substantially along the first direction. Optionally, an orthographic projection of the black matrix layer 3 on the base substrate 0 substantially coven those of the plurality of first touch electrodes 10. Optionally, the orthographic projection of the black matrix layer 3 on the base substrate 0 substantially coven orthographic projections of the plurality of first touch electrode patterns 10b.

The touch control display apparatus in some embodiments further includes a second electrode layer 2. In some embodiments, the second electrode layer 2 is substantially disposed in an inter-subpixel region of the touch control display apparatus. Optionally, the second electrode layer 2 is substantially in a region corresponding to the black matrix layer 3, e.g., an orthographic projection of the black matrix layer 3 on the base substrate 0 substantially covers that of the second touch electrode layer 2. As shown in FIG. 3 and FIG. 4, the second touch electrode layer 2 in some embodiments includes a plurality of second touch electrodes 20. The plurality of second touch electrodes 20 are arranged along the second direction. Each of the plurality of second touch electrodes 20 extends substantially along the first direction. Optionally, each of the plurality of second touch electrodes is in an inter-subpixel region between two adjacent rows of subpixels. Each of the two adjacent rows of subpixels extends substantially along the first direction. Optionally, an orthographic projection of the black matrix layer 3 on the base substrate 0 substantially covers those of the plurality of second touch electrodes 20.

In some embodiments, the plurality of first touch electrode patterns 10b from the plurality of first touch electrode 10 form a plurality of rows 10r of first touch electrode patterns, and the plurality of second touch electrodes 20 are a plurality of rows of second touch electrodes. Each of the plurality of rows 10r of first touch electrode patterns includes a plurality of first touch electrode patterns 10b respectively from the plurality of first touch electrode 10. As shown in FIG. 3, each of the plurality of rows 10r of first touch electrode patterns includes three of the plurality of first touch electrode patterns 10b respectively from three of the plurality of first touch electrode 10. Optionally, two adjacent rows of the plurality of rows of second touch electrodes sandwich one or more rows of the plurality of rows 10r of first touch electrode patterns 10b. Optionally, two adjacent rows of the plurality of rows 10r of first touch electrode patterns 10b sandwich one or more rows of the plurality of rows of second touch electrodes. In FIG. 3, two adjacent rows of the plurality of rows of second touch electrodes sandwich a single row of the plurality of rows 10r of first touch electrode patterns 10b, and two adjacent rows of the plurality of rows 10r of first touch electrode patterns 10b sandwich a single row of the plurality of rows of second touch electrodes. Optionally, two adjacent rows of the plurality of rows of second touch electrodes sandwich two rows of the plurality of rows 10r of first touch electrode patterns 10b. Optionally, two adjacent rows of the plurality of rows of first touch electrode patterns 10b sandwich two rows of the plurality of rows of second touch electrodes.

In some embodiments, all of the touch electrode layers of the touch control display apparatus are substantially disposed in an inter-subpixel region of the touch control display apparatus. Optionally, all of the touch electrode layers of the touch control display apparatus are substantially in a region corresponding to the black matrix layer 3, e.g., an orthographic projection of the black matrix layer 3 on the base substrate 0 substantially covers those of all of the touch electrode layers of the touch control display apparatus. Optionally, each of the touch electrode layers of the touch control display apparatus includes a plurality of touch electrodes, and an orthographic projection of the black matrix layer 3 on the base substrate 0 substantially covers those of all of the plurality of touch electrodes.

By having the touch electrodes in regions corresponding to the black matrix layer, interference between the touch electrodes and the display module can be avoided. Moiré patterns due to the interference with the display module can be reduced or eliminated in the present touch control display apparatus without the need of reducing the line width of the touch electrodes. Moreover, the overlapping areas between the first electrode layer and the second electrode layer are minimized in the present touch control display apparatus, resulting in significantly reduced parasitic capacitance. Touch detection accuracy can be greatly enhance.

Optionally, the touch control display apparatus is an in-cell type touch control display apparatus, in which one or all of the touch electrode layers are disposed in the display module. Optionally, the touch control display apparatus is an on-cell type touch control display apparatus, in which the black matrix layer is in a color filter substrate of the display module, and one or all of the touch electrode layers are outside the display module.

Optionally, the touch control display apparatus is an add-on type touch control display apparatus, such as a one-glass-solution type touch control display apparatus, in which the black matrix layer is in a color filter substrate of the display module, and the touch electrode layers are in a touch panel attached to the display module.

Optionally, the touch control display apparatus is a liquid crystal touch control display apparatus. Optionally, the touch control display apparatus is an organic light emitting diode touch control display apparatus.

Referring to FIG. 3, the touch control display apparatus in some embodiments further includes an array of a plurality of subpixels 40 along the first direction and the second direction. Each of the plurality of first touch electrodes 10 includes a plurality of first touch signal lines 10a and a plurality of first touch electrode patterns 10b. The plurality of first touch signal lines 10a are electrically connected in parallel, each of the plurality of first touch signal lines 10a extending substantially along the second direction. Each of the plurality of first touch signal lines 10a is substantially in an inter-subpixel region between two adjacent columns of subpixels of the array of the plurality of subpixels 40, each of the two adjacent columns of subpixels of the array of the plurality of subpixels 40 extending substantially along the second direction. Each of the plurality of first touch electrodes 10 includes one of the plurality of first touch signal lines 10a, or multiple of the plurality of first touch signal lines 10a electrically connected in parallel. The plurality of first touch electrode patterns 10b in a single one of the plurality of first touch electrodes 10 are electrically connected by the one or more of the plurality of first touch signal lines 10a in a single one of the plurality of first touch electrodes 10. Each of the plurality of first touch electrode patterns 10b is in an inter-subpixel region between two adjacent rows of subpixels of the array of the plurality of subpixels 40, each of the two adjacent rows of subpixels of the array of the plurality of subpixels 40 extending substantially along the first direction.

In some embodiments, each of the plurality of first touch electrodes 10 is electrically connected with multiple ones of the plurality of first touch signal lines 10a electrically connected in parallel. FIG. 3 depicts an embodiment in which each of the plurality of first touch electrodes 10 includes three of the plurality of first touch signal lines 10a, the three of the plurality of first touch signal lines 10a being electrically connected in parallel. Optionally, the multiple ones of the plurality of first touch signal lines 10a electrically connected in parallel in each of the plurality of first touch electrodes 10 are spaced apart from each other by one or more columns of subpixels. In FIG. 3, the three first touch signal lines 10a electrically connected in parallel and electrically connected with each of the plurality of first touch electrodes 10 are spaced apart from each other by a single column of subpixels. Optionally, at least a pair of the multiple ones of the plurality of first touch signal lines 10a electrically connected in parallel and electrically connected with each of the plurality of first touch electrodes 10 are spaced apart from each other by a plurality of columns of subpixels.

In some embodiments, the touch control display apparatus further includes a plurality of second touch signal lines 20s. Optionally, each of the plurality of second touch signal lines 20s is electrically connected to at least one of the plurality of second touch electrodes 20 to transmit touch signals to or from the at least one of the plurality of second touch electrodes 20. Referring to FIG. 4, the plurality of second touch signal lines 20s are in a peripheral area PA of the touch panel. Optionally, the plurality of first touch signal lines 10a are at least partially in a display area DA of the touch control display apparatus. In one example, and as shown in FIG. 4, the plurality of first touch signal lines 10a extends into the display area DA, electrically connecting the plurality of first touch electrode patterns 0 in each of the first touch electrodes 10.

As used herein the term "peripheral area" refers to an area of a display apparatus, a display panel, or a display substrate (e.g., an opposing substrate or an array substrate) in a display panel, where various circuits and wires are provided to transmit signals to the display apparatus, the display panel, or the display substrate. To increase the transparency of the display apparatus, non-transparent or opaque components of the display apparatus (e.g., battery, printed circuit board, metal frame), can be disposed in the peripheral area rather than in the display area.

As used herein, the term "display area" refers to an area of a display apparatus, a display panel, or a display substrate (e.g., an opposing substrate or an array substrate) in a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

Figure 5:
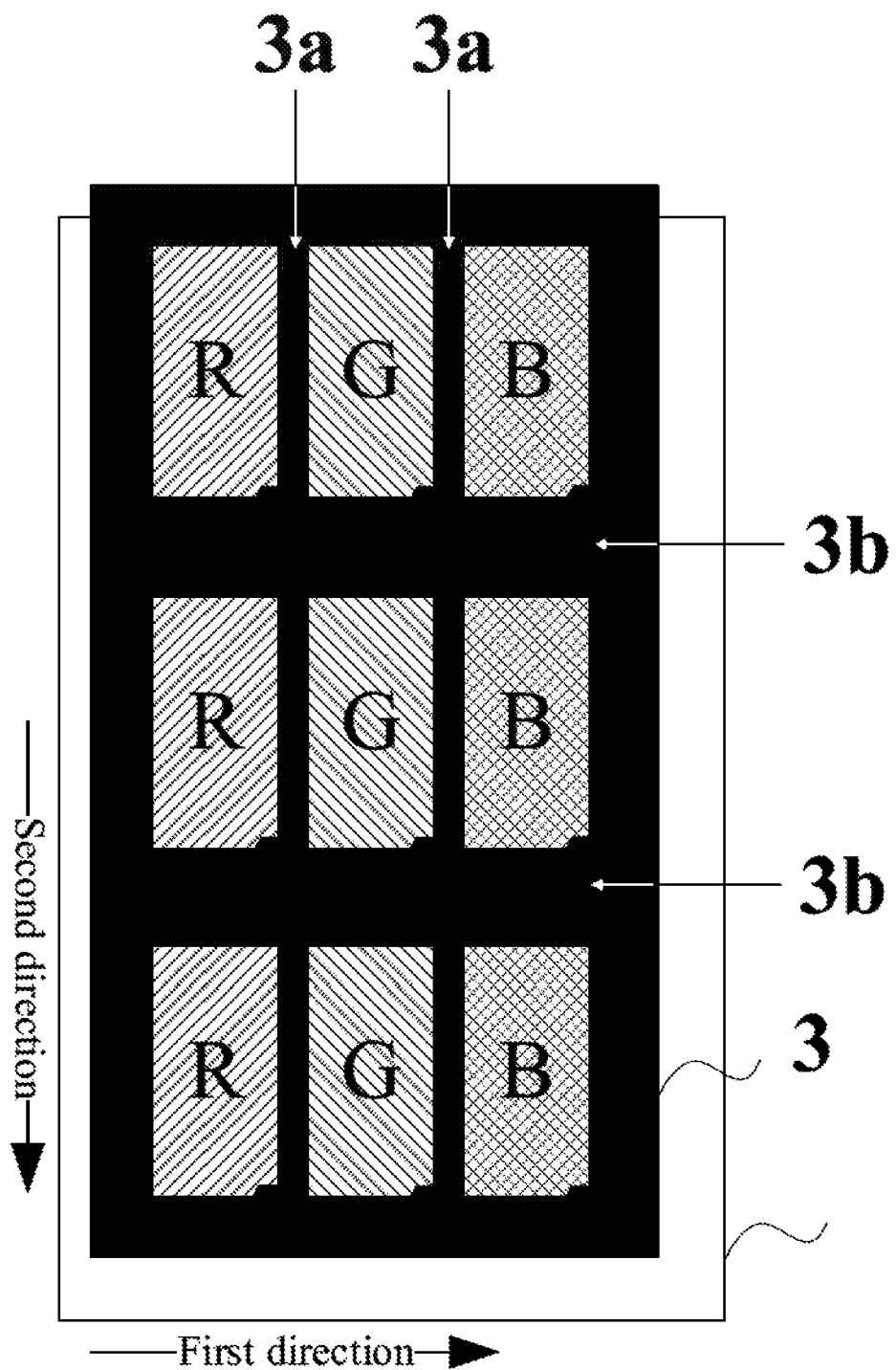
FIG. 5 is a schematic diagram illustrating the structure of a black matrix layer in some embodiments according to the present disclosure.

FIG. 5 is a schematic diagram illustrating the structure of a black matrix layer in some embodiments according to the present disclosure. Referring to FIG. 5, the black matrix layer 3 in some embodiments includes a plurality of first black matrices 3a along the first direction, each of the plurality of first black matrices 3a extending substantially along the second direction, and a plurality of second black matrices 3b along the second direction, each of the plurality of second black matrices 3b extending substantially along the first direction. Referring to FIG. 3 and FIG. 5, each of the plurality of first touch signal lines 10a is in a region corresponding to one of the plurality of first black matrices 3a. Optionally, two adjacent first touch electrodes of the plurality of first touch electrodes 10 are not spaced apart by any of the plurality of first black matrices 3a, e.g., two adjacent first touch signal lines from the two adjacent first touch electrodes of the plurality of first touch electrodes 10 are respectively in regions corresponding to two adjacent first black matrices of the plurality of first black matrices 3a. Optionally, two adjacent first touch electrodes of the plurality of first touch electrodes 10 are spaced apart by one or more of the plurality of first black matrices 3a, e.g., the plurality of first touch signals lines 10a is absent in a region corresponding to the one or more of the plurality of first black matrices 3a between the two adjacent first touch electrodes of the plurality of first touch electrodes 10.

Optionally, two adjacent first touch electrodes of the plurality of first touch electrodes 10 are spaced apart by three first black matrices.

Each of the plurality of first touch electrodes 10 may include any appropriate number of first touch signal lines. Optionally, at least one of the plurality of first touch electrodes 10 includes three of the plurality of first touch signal lines 10a. Optionally, at least one of the plurality of first touch electrodes 10 includes a single first touch signal line.

Optionally, each of the plurality of first touch signal lines 10a is a single signal line. Optionally, the single electrode line has a line width in a range of approximately 6 μm to approximately 8 μm.

Referring to FIG. 3 and FIG. 5, each of the plurality of first touch electrode patterns 10b is in a region corresponding to a portion of one of the plurality of second black matrices 3b. Optionally, two or more (e.g., 2, 3, or 4) adjacent rows of subpixels of the array of the plurality of subpixels 40 are sandwiched between two adjacent first touch electrode patterns of the plurality of first touch electrode patterns 10b of a single one of the plurality of the first touch electrodes 10, each of the two adjacent rows of subpixels of the array of the plurality of subpixels 40 extending substantially along the first direction. Optionally, four adjacent rows of subpixels of the array of the plurality of subpixels 40 are sandwiched between two adjacent first touch electrode patterns of the plurality of first touch electrode patterns 10b of a single one of the plurality of the first touch electrodes 10.

In some embodiments, each of the plurality of first touch electrode 10 includes N numbers of first touch signal lines in regions corresponding to N numbers of adjacent first black matrices. Optionally, each of the plurality of first touch signal lines 10a of each of the plurality of first touch electrode 10 has a length substantially along the second direction substantially the same as a sum of widths of N numbers of subpixels substantially along the second direction. Optionally, each of the plurality of first touch signal lines 10a of each of the plurality of first touch electrode 10 spans over N subpixels. Optionally, each of the plurality of first touch signal lines 10a of each of the plurality of first touch electrode 10 spans over (N+1) subpixels.

Optionally, each of the plurality of first touch electrode patterns 10b is a mesh electrode. Optionally, each of the plurality of first touch electrode patterns 0 is a single electrode line. Optionally, the wires of each of the plurality of first touch electrode patterns 10b has a line width in a range of approximately 6 μm to approximately 8 μm.

Referring to FIG. 3 and FIG. 5, each of the plurality of second touch electrodes 20 is in a region corresponding to one of the plurality of second black matrices 3b. Optionally, two or more (e.g., 2, 3, or 4) adjacent rows of subpixels of the array of the plurality of subpixels 40 are sandwiched between two adjacent second touch electrodes of the plurality of second touch electrodes 20, each of the two adjacent rows of subpixels of the array of the plurality of subpixels 40 extending substantially along the first direction. Optionally, the plurality of second touch electrodes 20 and the plurality of first touch electrode patterns 10b are alternately disposed along the second direction.

Optionally, each of the plurality of second touch electrodes 20 is a mesh electrode. Optionally, each of the plurality of second touch electrodes 20 is a single electrode line. Optionally, the wires of each of the plurality of second touch electrodes 20 has a line width in a range of approximately 6 μm to approximately 8 μm.

Referring to FIG. 5, in some embodiments, each of the plurality of first black matrices 3a abuts longitudinal sides of subpixels of two adjacent columns of subpixels, each of the two adjacent columns of subpixels extending substantially along the second direction; and each of the plurality of second black matrices 3b abuts lateral sides of subpixels of two adjacent rows of subpixels, each of the two adjacent rows of subpixels extending substantially along the first direction. Optionally, each of the plurality of first black matrices 3a has a first width substantially along the first direction in a range of approximately 6 μm to approximately 9 μm, and each of the plurality of second black matrices 3b has a second width substantially along the second direction in a range of approximately 30 μm to approximately 40 μm.

In some embodiments, each of the plurality of second black matrices 3b abuts longitudinal sides of subpixels of two adjacent columns of subpixels, each of the two adjacent columns of subpixels extending substantially along the second direction; and each of the plurality of first black matrices 3a abuts lateral sides of subpixels of two adjacent rows of subpixels, each of the two adjacent rows of subpixels extending substantially along the first direction.

Figure 6:
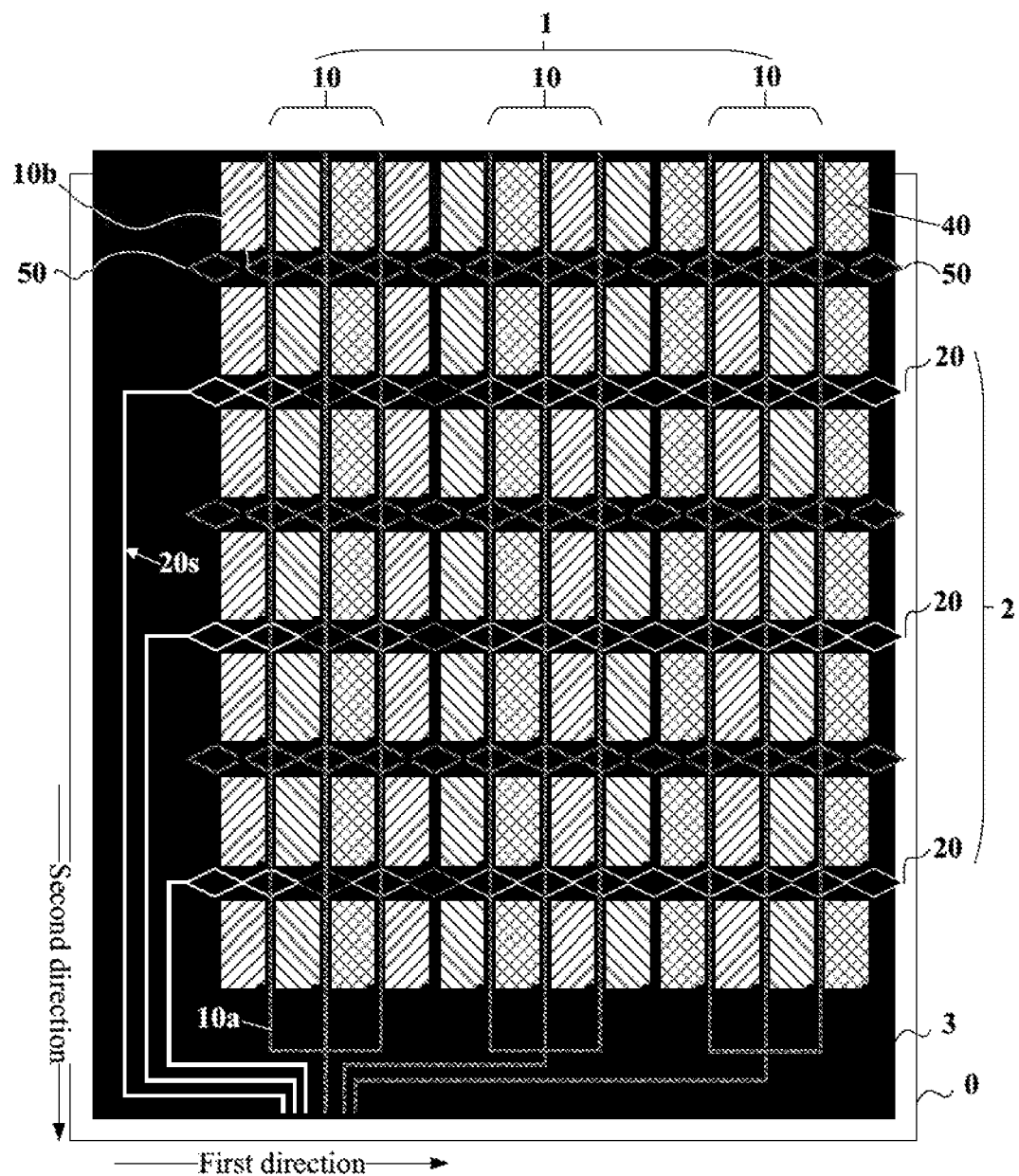
FIG. 6 is a schematic diagram illustrating the structure of a touch control display apparatus in some embodiments according to the present disclosure.

In some embodiments, the touch control display apparatus further includes a plurality of fill patterns. FIG. 6 is a schematic diagram illustrating the structure of a touch control display apparatus in some embodiments according to the present disclosure. Referring to FIG. 6, the touch control display apparatus in some embodiments includes a plurality of fill patterns 50. The plurality of fill patterns 50 may be formed in a same patterning process as that for the plurality of first touch electrode patterns 10b, during which an electrode material layer may be etched to insulate the plurality of first touch electrode patterns 10b from the plurality of fill patterns 50. Referring to FIG. 5 and FIG. 6, each of the plurality of fil patterns 50 is in a region corresponding to a portion of one of the plurality of second black matrices 3b.

Figure 7:
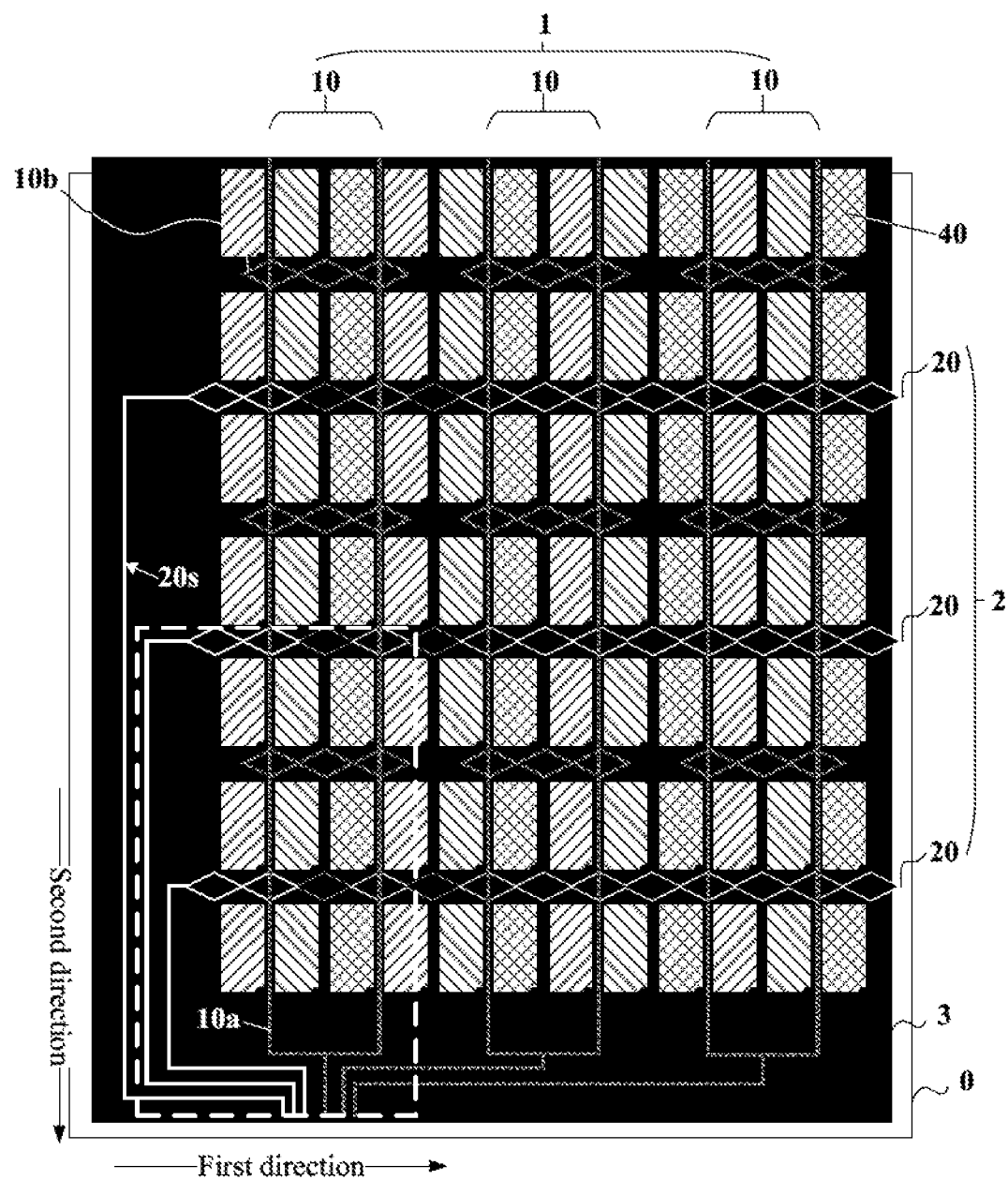
FIG. 7 is a schematic diagram illustrating the structure of a touch control display apparatus in some embodiments according to the present disclosure.

The touch control display apparatus may have various appropriate touch electrode density. In FIG. 3, the plurality of first touch signal lines 10a in each of the plurality of first electrodes 10 are in regions corresponding to three adjacent first black matrices of the plurality of first black matrices 3a. FIG. 7 is a schematic diagram illustrating the structure of a touch control display apparatus in some embodiments according to the present disclosure. Referring to FIG. 7, two adjacent first touch signal lines of the plurality of first touch signal lines 10a in each of the plurality of first electrodes 10 are spaced apart by one or more of the plurality of first black matrices 3a, i.e., the plurality of first touch signal lines 10a is absent in a region corresponding to the one or more of the plurality of first black matrices 3a between the two adjacent first touch signal lines of the plurality of first touch signal lines 10a in each of the plurality of first electrodes 10.

Optionally, the first touch electrode layer 1 is a touch scanning electrode layer, and the second touch electrode layer 2 is a touch sensing electrode layer. Optionally, the first touch electrode layer 1 is a touch sensing electrode layer, and the second touch electrode layer 2 is a touch scanning electrode layer.

In another aspect, the present disclosure provides a method of fabricating a touch apparatus. In some embodiments, the method includes forming a first touch electrode layer on a base substrate; and forming a second touch electrode layer. Optionally, the step of forming the first touch electrode layer includes forming a plurality of first touch electrodes. Optionally, the step of forming the plurality of first touch electrodes includes forming a plurality of first touch electrode patterns in each of the plurality of first touch electrodes. Optionally, the plurality of first touch electrode patterns are formed along the second direction, each of which extending substantially along a first direction. Optionally, the plurality of second touch electrodes are formed along the second direction, each of the plurality of second touch electrodes extending substantially along the first direction. The first touch electrode layer and the second touch electrode layer are formed to be insulated from each other. Optionally, each of the plurality of first touch electrode patterns is formed in an inter-subpixel region between two adjacent rows of subpixels, each of the two adjacent rows of subpixels formed to extend substantially along the first direction. Optionally, the first touch electrode layer is formed so that an orthographic projection of the black matrix layer on the base substrate substantially coven those of the plurality of first touch electrodes. Optionally, the second touch electrode layer is formed so that an orthographic projection of the black matrix layer on the base substrate substantially covers those of the plurality of second touch electrodes.

In some embodiments, the method further includes forming a plurality of first touch signal lines, each of which extending substantially along the second direction. Optionally, each of the plurality of first touch electrodes is formed to be electrically connected with one or more of the plurality of first touch signal lines electrically connected in parallel. The plurality of first touch electrode patterns in each of the plurality of first touch electrodes are formed to be electrically connected by the one or more of the plurality of first touch signal lines. Optionally, each of the plurality of first touch electrodes is formed to be electrically connected with multiple ones of the plurality of first touch signal lines electrically connected in parallel. Optionally, each of the plurality of first touch signal lines is formed in an inter-subpixel region between two adjacent columns of subpixels, each of the two adjacent columns of subpixels formed to extend substantially along the second direction.

In some embodiments, the plurality of first touch electrode patterns are formed so that the plurality of first touch electrode patterns from the plurality of first touch electrodes form a plurality of rows of first touch electrode patterns. Each of the plurality of rows of first touch electrode patterns is formed to include a plurality of first touch electrode patterns respectively from the plurality of first touch electrode. In one example, each of the plurality of rows of first touch electrode patterns is formed to include three of the plurality of first touch electrode patterns respectively from three of the plurality of first touch electrode. Optionally, the plurality of second touch electrodes are formed as a plurality of rows of second touch electrodes. Optionally, two adjacent rows of the plurality of second touch electrodes sandwich one or more rows of the plurality of rows of first touch electrode patterns. Optionally, two adjacent rows of the plurality of rows of first touch electrode patterns sandwich one or more rows of the plurality of second touch electrodes. Optionally, the plurality of rows of second touch electrodes and the plurality of rows of first touch electrode patterns are formed to be alternately disposed along the second direction.

In some embodiments, the method further includes forming an insulating layer between the first touch electrode layer and the second touch electrode layer.

In another aspect, the present disclosure provides a method of fabricating a touch control display apparatus. The method includes forming a touch panel according to the method described above. In some embodiments, the method further includes forming an array of a plurality of subpixels along the first direction and the second direction. Optionally, each of the plurality of first touch electrode patterns is formed in an inter-subpixel region between two adjacent rows of subpixels. Optionally, each of the plurality of second touch electrodes is in an inter-subpixel region between two adjacent rows of subpixels. Each of the two adjacent rows of subpixels extends substantially along the first direction. Optionally, the plurality of second touch electrodes are formed so that two adjacent rows of subpixels are sandwiched between two adjacent second touch electrodes of the plurality of second touch electrodes, each of the two adjacent rows of subpixels formed to extend substantially along the first direction. Optionally, two or more adjacent rows of subpixels are formed to be sandwiched between two adjacent rows of the plurality of second touch electrodes. Optionally, two or more adjacent rows of subpixels are formed to be sandwiched between two adjacent rows of the plurality of rows of first touch electrode patterns. Each of the two adjacent rows of subpixel areas extends substantially along the first direction.

In some embodiments, the method further includes forming a black matrix layer. Optionally, the step of forming the black matrix layer includes forming a plurality of first black matrices along the first direction and a plurality of second black matrices along the second direction. Optionally, each of the plurality of first black matrices is formed to extend substantially along the second direction. Optionally, each of the plurality of second black matrices is formed to extend substantially along the first direction. Optionally, each of the plurality of first black matrices is formed to abut longitudinal sides of subpixels of two adjacent columns of subpixels, each of the two adjacent columns of subpixels formed to extend substantially along the second direction. Optionally, each of the plurality of second black matrices is formed to abut lateral sides of subpixels of two adjacent rows of subpixels, each of the two adjacent rows of subpixels formed to extend substantially along the first direction.

Optionally, each of the plurality of first black matrices is formed to have a first width substantially along the first direction in a range of approximately 6 μm to approximately 9 μm, and each of the plurality of second black matrices is formed to have a second width substantially along the second direction in a range of approximately 30 μm to approximately 40 μm.

Optionally, each of the plurality of first touch electrodes is formed as a mesh electrode. Optionally, each of the plurality of second touch electrodes is formed as a mesh electrode.

Figure 8:
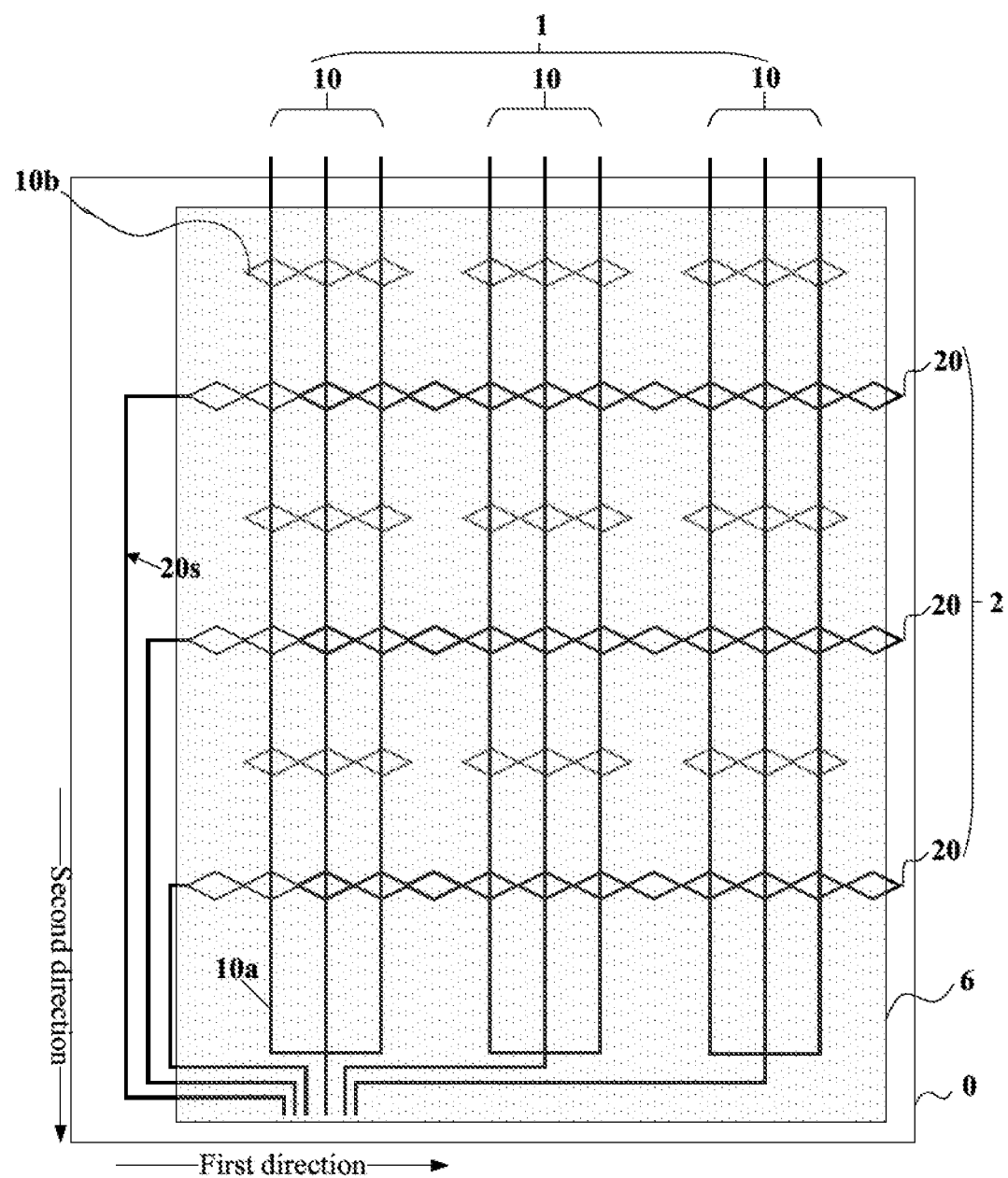
FIG. 8 is a schematic diagram illustrating the structure of a touch substrate in some embodiments according to the present disclosure.

In another aspect, the present disclosure provides a touch substrate. In some embodiments, the touch substrate includes a base substrate, a first touch electrode layer on the base substrate, and a second touch electrode layer. FIG. 8 is a schematic diagram illustrating the structure of a touch substrate in some embodiments according to the present disclosure. Referring to FIG. 8, the touch substrate in some embodiments includes a base substrate 0 and a first touch electrode layer 1 on the base substrate 0. Optionally, the first touch electrode layer 1 includes a plurality of first touch electrodes 10.

The touch substrate in some embodiments further includes a second electrode layer 2. Optionally, the second touch electrode layer 2 includes a plurality of second touch electrodes 20 arranged along the second direction, each of the plurality of second touch electrodes 20 extending substantially along the first direction. Optionally, the touch substrate further includes an insulating layer 6 between the first touch electrode layer 1 and the second touch electrode layer 2.

Referring to FIG. 8, each of the plurality of first touch electrodes 10 in some embodiments includes a plurality of first touch electrode patterns 10b. The plurality of first touch electrode patterns 10b are arranged along the second direction. Each of the plurality of first touch electrode patterns 10b extends substantially along a first direction. Optionally, each of the plurality of first touch electrode patterns 10b is in an inter-subpixel region between two adjacent rows of subpixel areas. Optionally, each of the plurality of second touch electrodes 20 is in an inter-subpixel region between two adjacent rows of subpixel areas. Each of the two adjacent rows of subpixels extends substantially along the first direction.

In some embodiments, the touch substrate further includes a plurality of first touch signal lines 10a. Each of the plurality of first touch signal lines 10a extends substantially along the second direction. Optionally, each of the plurality of first touch electrodes 10 is electrically connected with one or more of the plurality of first touch signal lines 10a electrically connected in parallel. Optionally, the plurality of first touch electrode patterns 10b in each of the plurality of first touch electrodes 10 are electrically connected by the one or more of the plurality of first touch signal lines 10a. Optionally, each of the one or more of the plurality of first touch signal lines 10a electrically connected in parallel is in an inter-subpixel region between two adjacent columns of subpixel areas. Each of the two adjacent columns of subpixel areas extends substantially along the second direction. Each of the plurality of first touch electrodes 10 may include any appropriate number of first touch signal lines. Optionally, at least one of the plurality of first touch electrodes 10 includes three first touch signal lines. Optionally, at least one of the plurality of first touch electrodes 10 includes a single first touch signal line. Optionally, each of the plurality of first touch signal lines 10a has a line width in a range of approximately 6 μm to approximately 8 μm.

Optionally, each of the plurality of first touch electrode patterns 10b is a mesh electrode. Optionally, the wires of each of the plurality of first touch electrode patterns 10b have a line width in a range of approximately 6 μm to approximately 8 μm.

Optionally, the plurality of second touch electrodes 20 and the plurality of first touch electrode patterns 10b are alternately disposed along the second direction.

Optionally, each of the plurality of second touch electrodes 20 is a mesh electrode. Optionally, the wires of each of the plurality of second touch electrodes 20 has a line width in a range of approximately 6 μm to approximately 8 μm.

Optionally, each of the plurality of first touch electrodes 10 is a mesh electrode, e.g., a metal mesh electrode. Optionally, each of the plurality of second touch electrodes 20 is a mesh electrode, e.g., a metal mesh electrode.

Optionally, the touch substrate further includes a plurality of fill patterns.

In another aspect, the present disclosure provides a touch panel having a touch substrate described herein.

In another aspect, the present disclosure provides a touch control display apparatus having the touch panel described herein or fabricated by a method described herein. Examples of appropriate touch control display apparatuses include, but are not limited to, an electronic paper, a mobile phone, a tablet computer, a television, a monitor, a notebook computer, a digital album, a GPS, etc.

Figure 9:
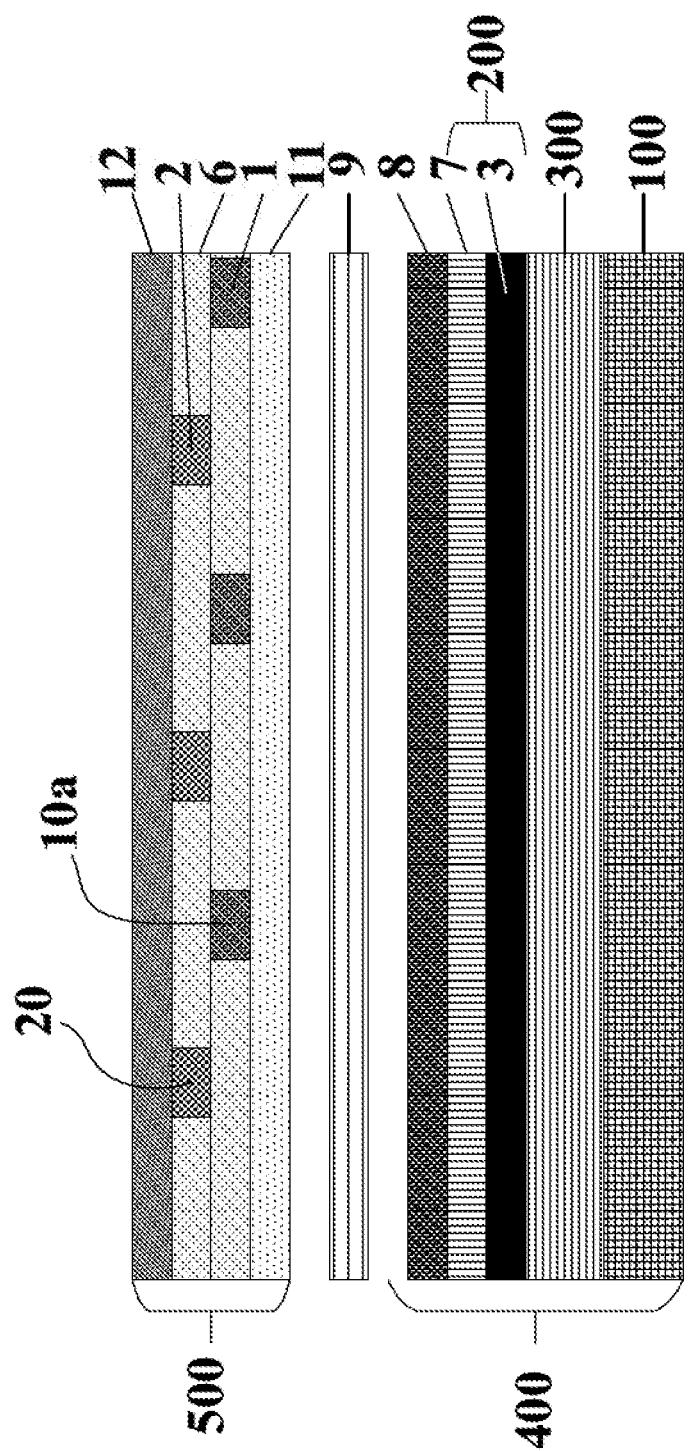
FIG. 9 is a cross-sectional view of a touch control display apparatus in some embodiments according to the present disclosure.

FIG. 9 is a cross-sectional view of a touch control display apparatus in some embodiments according to the present disclosure. Referring to FIG. 9, the touch control display apparatus in some embodiments includes a liquid crystal display module 400 and a touch panel 500. The liquid crystal display module 400 and the touch panel 500 are adhered together by an optical clear resin layer 9. The liquid crystal display module includes an array substrate 100, a counter substrate 200 facing the array substrate 100, and a liquid crystal layer 300 between the array substrate 100 and the counter substrate 200. The counter substrate 200 includes a black matrix layer 3 on a first base substrate 7. The liquid crystal display module 400 further includes a polarizer layer S on a side of the counter substrate 200 distal to the array substrate 100. The touch panel 500 includes a second base substrate 12, a second touch electrode layer 2 on the second base substrate 12, an insulating layer 6 on a side of the second touch electrode layer 2 distal to the second base substrate 12, a first touch electrode layer 1 on a side of the insulating layer 6 distal to the second touch electrode layer 2, and an overcoat layer 11 on a side of the first touch electrode layer 1 distal to the second base substrate 12. In the cross-sectional view of FIG. 9, a plurality of first touch signal lines 10a of the first touch electrode layer 1 are shown, and a plurality of second touch electrodes 20 of the second touch electrode layer 2 are shown. The first touch electrode layer 1 and the second touch electrode layer 2 are both in regions corresponding to the black matrix layer 3.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A touch panel, comprising:
    a base substrate;
    a first touch electrode layer on the base substrate and comprising a plurality of first touch electrodes, a respective one of the plurality of first touch electrodes comprises a plurality of first touch electrode patterns along a second direction, a respective one of which extending substantially along a first direction;

a second touch electrode layer comprising a plurality of second touch electrodes along the second direction, a respective one of the plurality of second touch electrodes extending substantially along the first direction; and a plurality of first touch signal lines, a respective one of which extending substantially along the second direction in parallel;

wherein the first touch electrode layer and the second touch electrode layer are insulated from each other;

the respective one of the plurality of first touch electrodes is electrically connected with one or more of the plurality of first touch signal lines;

the plurality of first touch electrode patterns in the respective one of the plurality of first touch electrodes are electrically connected by the one or more of the plurality of first touch signal lines; and the respective one of the plurality of first touch electrodes is electrically connected with multiple ones of the plurality of first touch signal lines electrically connected in parallel.

2. The touch panel of claim 1, wherein the plurality of first touch electrode patterns from the plurality of first touch electrodes constitute a plurality of rows of first touch electrode patterns;

the plurality of second touch electrodes constitute a plurality of rows of second touch electrodes;

two adjacent rows of the plurality of rows of second touch electrodes sandwich one or more rows of the plurality of rows of first touch electrode patterns; and two adjacent rows of the plurality of rows of first touch electrode patterns sandwich one or more rows of the plurality of rows of second touch electrodes.

3. The touch panel of claim 2, wherein the plurality of rows of second touch electrodes and the plurality of rows of first touch electrode patterns are alternately disposed along the second direction.

4. The touch panel of claim 1, wherein the respective one of the plurality of first touch electrode patterns is a mesh electrode.

5. The touch panel of claim 4, wherein the mesh electrode of the respective one of the plurality of first touch electrode patterns has a repeating geometric shape.

6. The touch panel of claim 1, wherein the respective one of the plurality of second touch electrodes is a mesh electrode.

7. The touch panel of claim 6, wherein the mesh electrode of the respective one of the plurality of second touch electrodes has a repeating geometric shape.

8. A touch control display apparatus having an array of a plurality of subpixels, comprising a touch panel;

wherein the touch panel comprises:

a base substrate;

a first touch electrode layer on the base substrate and comprising a plurality of first touch electrodes, a respective one of the plurality of first touch electrodes comprises a plurality of first touch electrode patterns along a second direction, a respective one of which extending substantially along a first direction; and a second touch electrode layer comprising a plurality of second touch electrodes along the second direction, a respective one of the plurality of second touch electrodes extending substantially along the first direction;

wherein the first touch electrode layer and the second touch electrode layer are insulated from each other;

the respective one of the plurality of first touch electrode patterns is in an inter-subpixel region between two adjacent columns of subpixels;

the respective one of the plurality of second touch electrodes is in an inter-subpixel region between two adjacent columns of subpixels; and the two adjacent columns of subpixels extend substantially along the second direction, respectively.

9. The touch control display apparatus of claim 8, wherein the plurality of first touch electrode patterns from the plurality of first touch electrodes constitute a plurality of rows of first touch electrode patterns;

the plurality of second touch electrodes constitute a plurality of rows of second touch electrodes;

two or more adjacent rows of subpixels are sandwiched between two adjacent rows of the plurality of rows of second touch electrodes;

two or more adjacent rows of subpixels are sandwiched between two adjacent rows of the plurality of rows of first touch electrode patterns; and two adjacent rows of subpixel areas extend substantially along the first direction, respectively.

10. The touch control display apparatus of claim 8, further comprising a black matrix layer;

wherein an orthographic projection of the black matrix layer on the base substrate substantially covers orthographic projections of the plurality of first touch electrode patterns and the plurality of second touch electrodes.

11. The touch control display apparatus of claim 8, wherein the touch panel further comprises a plurality of first touch signal lines, a respective one of which extending substantially along the second direction in parallel;

the respective one of the plurality of first touch electrodes is electrically connected with one or more of the plurality of first touch signal lines;

the plurality of first touch electrode patterns in the respective one of the plurality of first touch electrodes are electrically connected by the one or more of the plurality of first touch signal lines; and the one or more of the plurality of first touch signal lines electrically connected in parallel are in an inter-subpixel region between two adjacent columns of subpixels, respectively, the two adjacent columns of subpixels extending substantially along the second direction, respectively.

12. The touch control display apparatus of claim 11, wherein the respective one of the plurality of first touch electrodes is electrically connected with multiple ones of the plurality of first touch signal lines electrically connected in parallel; and the multiple ones of the plurality of first touch signal lines electrically connected in parallel are spaced apart from each other by one or more columns of subpixels.

13. The touch control display apparatus of claim 11, further comprising a black matrix layer;

wherein an orthographic projection of the black matrix layer on the base substrate substantially covers orthographic projections of the plurality of first touch signal lines.

14. A touch substrate having an array of a plurality of subpixel areas along a first direction and a second direction, comprising:

a base substrate;

a first touch electrode layer on the base substrate and comprising a plurality of first touch electrodes, a respective one of the plurality of first touch electrodes comprises a plurality of first touch electrode patterns along the second direction, a respective one of which extending substantially along the first direction; and a second touch electrode layer comprising a plurality of second touch electrodes along the second direction, a respective one of the plurality of second touch electrodes extending substantially along the first direction;

wherein the first touch electrode layer and the second touch electrode layer are insulated from each other;

the respective one of the plurality of first touch electrode patterns is in an inter-subpixel region between two adjacent columns of subpixel areas;

the respective one of the plurality of second touch electrodes is in an inter-subpixel region between two adjacent columns of subpixel areas; and the two adjacent columns of subpixels extend substantially along the second direction, respectively.

15. The touch substrate of claim 14, wherein the touch substrate further comprises a plurality of first touch signal lines, a respective one of which extending substantially along the second direction in parallel;

the respective one of the plurality of first touch electrodes is electrically connected with one or more of the plurality of first touch signal lines;

the plurality of first touch electrode patterns in the respective one of the plurality of first touch electrodes are electrically connected by the one or more of the plurality of first touch signal lines; and the one or more of the plurality of first touch signal lines electrically connected in parallel are in an inter-subpixel region between two adjacent columns of subpixel areas, respectively; and the two adjacent columns of subpixel areas extend substantially along the second direction, respectively.

16. A touch control display apparatus comprising the touch substrate of claim 14.

* * * * *